United States Patent Office 2,881,213
Patented Apr. 7, 1959

2,881,213

PROCESS FOR THE CONVERSION OF ACROLEIN AND METHACROLEIN TO THE CORRESPONDING UNSATURATED ACIDS

James D. Idol, Jr., Shaker Heights, James L. Callahan, Bedford, and Robert W. Foreman, Cleveland, Ohio, assignors to The Standard Oil Company, Cleveland, Ohio, a corporation of Ohio No Drawing. Application December 17, 1957
Serial No. 703,268

10 Claims. (Cl. 260—530)

This invention relates to the oxidation of unsaturated aldehydes. It deals with a new method of carrying out such an oxidation selectively to produce the corresponding unsaturated carboxylic acid in high yields. Another aspect of the invention deals with the use of certain catalysts for the conversion of unsaturated aldehydes to the corresponding unsaturated acids. The invention has particular utility in connection with the production of acrylic and methacrylic acids which may be subsequently converted to lower alkyl esters for use in the plastics industry.

The oxidation of saturated aldehydes to the corresponding saturated carboxylic acids is a well-known reaction which is carried out commercially on a large scale, especially for the production of acetic acid. Unsaturated aldehydes, however, have a marked tendency to undergo side reactions during oxidation, and consequently only poor yields of desirable acids are obtained under the usual conditions of reaction.

Some unsaturated acid can be obtained by oxidizing unsaturated aldehydes with hydrogen peroxide according to U.S. Patent 2,377,584 but large amounts of dihydroxy aldehyde are simultaneously produced in the patented process.

U.S. Patents 2,744,928 and 2,744,929 disclose methods by which unsaturated aldehydes may be converted to the corresponding unsaturated carboxylic acid. These methods involve a liquid phase reaction in the presence of a solvent and they require the use of both a catalyst and a peroxidizing agent such as hydrogen peroxide. This process has the disadvantage of involving solvent recovery steps and the use of hydrogen peroxide as a source of oxygen is not as economic as other oxygen sources.

It is the object of the present invention to overcome the disadvantages of prior methods of producing unsaturated carboxylic acids from unsaturated aldehydes by providing an efficient, commercially attractive method for converting unsaturated aldehydes to the corresponding carboxylic acids by direct vapor phase reaction of the aldehyde with oxygen in the presence of a catalyst. It has been found that unsaturated aldehydes can be selectively oxidized at the aldehyde group to produce high yields of unsaturated carboxylic acid by carrying out a catalytic vapor phase reaction employing oxygen as the oxidizing agent. It was most unexpected to find that an unsaturated aldehyde could be successfully oxidized to the corresponding unsaturated acid in the vapor phase in view of the known highly reactive nature of the double bond in unsaturated aldehydes both with reference to oxidation and polymerization. Workers in the prior art apparently believed that the reaction had to be carried out in the liquid phase and that if the reaction were conducted at the elevated temperatures necessary to a vapor phase reaction that useless side reactions of the unsaturated aldehydes would predominate over the desired reaction. However, we have discovered a process which surprisingly produces good yields of the unsaturated acids. It was even more surprising that the undesirable side reactions which were thought to be characteristic of the unsaturated aldehydes do not occur to any appreciable extent in the process of our invention.

The unsaturated acids produced according to the process of this invention have wide utility in the plastics industry, either in their free form or as related compounds such as the esters. The ethyl and methyl esters of acrylic and methacrylic acids, for example, are in great demand at the present time.

In brief, the process of this invention is carried out by reacting an unsaturated aldehyde with oxygen in the vapor phase in the presence of a catalyst. The catalyst employed in this process may be selected from the group consisting of the oxides of molybdenum and chromium. Another feature of the process relates to the addition of water in the vapor phase to the reaction zone, but the process is not limited to one in which water is added to the reaction mixture as the desired reaction will occur in the absence of water with some reduction in yield. The process of this invention is particularly applicable to the oxidation of aliphatic unsaturated aldehydes, e.g., acrolein and methacrolein.

The catalytic agent employed in the process of this invention is selected from the group consisting of the oxides of molybdenum and chromium. In certain instances it may be desirable to employ various combinations of the members of this group as the catalytic agent. Although the catalysts described herein may be employed in an unsupported form, we prefer to employ them in conjunction with a support. If a support is employed, the final catalyst should comprise at least 10 weight percent of the catalytic material and particularly good results are obtained when the final composition comprises at least about 20 weight percent of the catalytic agent. The preferred support is silica but it is not required that the silica be pure and it may contain small amounts of alumina. Other inert supports such as titania, zirconium oxide and the like may also be conveniently employed.

It is preferred that the surface area of the catalyst not be too great. It has been observed that a catalyst having a high surface area has a high activity which impairs the selectivity of the catalyst and it may result in the oxidation of the unsaturated aldehyde beyond the desired degree. The surface area as measured by conventional methods should be in the range of 1 to 250 square meters per gram and it is preferred that the surface area of the catalyst be in the range of about 25 to about 100 square meters per gram.

The catalytic agent may be incorporated on the support by means of either impregnation or co-gelation; however, it is preferred to prepare the catalyst by co-gelling the catalytic agent with the support. The latter method yields a catalyst which has superior activity for the desired reaction and which has a greater degree of homogeneity than the impregnated catalyst. Whatever the method of preparation, it may be beneficial to subject the catalyst to heat treatment after preparation. It has been observed that there is little advantage to employing temperatures of over 1000° F. for such heat treatment.

Oxygen for the process of this invention may be supplied either in the form of air or as free molecular oxygen and the reaction will proceed to some extent in the absence of added oxygen since the catalyst employed in the process will furnish some oxygen to the reaction, but in the preferred mode of executing the process of this invention additional oxygen is supplied to the reactor. Air is the preferred source of oxygen since the nitrogen contained therein serves as a purge gas in the reactor. The amount of oxygen fed to the reactor based on 1 mol of unsaturated aldehyde should be in the range of 0.5 to 50 mols, but the best results are obtained when the molal ratio of oxygen to unsaturated aldehyde is about 1:1.

As mentioned heretofore, water has a beneficial effect on the course of the reaction and relatively large quantities of water may be fed to the reactor along with the unsaturated aldehyde. The molal ratio of water to the unsaturated aldehyde may be in the range of 0:1 to 12:1, but a ratio of about 3:1 is preferred.

The temperature at which the reaction is to be conducted has an effect on conversion; and while temperatures in the range of 400 to 850° F. may be employed, the best results are obtained when the temperature is in the range of about 450 to 750° F. A temperature of about 700° F. appears to be optimum for the conversion of acrolein to acrylic acid. Generally, the reaction is carried out at about atmospheric pressure but other pressures are also operable.

Another process variable is the apparent contact time which is defined here below:

Apparent contact time
$$= \frac{\text{Apparent volume of the catalyst in the reactor}}{\text{Volume of material at reaction conditions fed to the reactor per unit time}}$$

The volume of material fed to the reaction is measured at the conditions of the reaction. In connection with the present process, it is customary to describe the contact time in terms of seconds. Broadly stated, contact times of 1 to 150 seconds have been found to be operable, but the preferred range is 15 to 25 seconds.

The process of this invention may be conducted intermittently or continuously. A fixed-bed reactor employing a pelleted form of a catalyst may be employed, and it is also feasible to conduct the process in a reactor containing a fluidized catalyst bed. Since the reaction is exothermic, the temperature within the reactor must be regulated in order to control the reaction. It appears that the operation of a fluidized bed reactor offers some advantage from the standpoint of temperature regulation within the reactor.

The catalyst employed in this process is not materially affected by the reaction, and since it is not usually necessary to regenerate the catalyst no provision is ordinarily made for regeneration. However, catalyst regeneration is contemplated within the scope of this invention as certain operations may require such a step.

The products of this reaction may include carbon monoxide, carbon dioxide, and the unsaturated acid together with any unconverted unsaturated aldehyde. The desired product of the reaction; namely the unsaturated acid, may be recovered from the reactor effluent gases by conventional methods such as condensation, scrubbing with water or other suitable solvent, or compression followed by a subsequent expansion. If water scrubbing is employed in the case of the low molecular weight acids, it is advantageous to employ a hot scrubbing solution since the unreacted aldehydes and other light gases will generally boil at lower temperatures than the acids and they may be purified and recycled directly to the reactor. If there are any difficulties due to polymerization of the unsaturated acid when the product is recovered by water scrubbing, such difficulties may be overcome by adding a small amount of any of the known polymerization inhibitors to the scrubbing solution; as for example, hydroquinone. Other additives may also be conveniently employed, but inhibitors containing an amine should be avoided as they tend to accelerate polymerization.

In order to more fully illustrate the process of this invention, a number of illustrative examples of the process are given below. In the examples the following definitions are employed:

Conversion
$$= \frac{\text{Weight of unsaturated aldehyde in the feed} - \text{Weight of unsaturated aldehyde in the effluent}}{\text{Weight of unsaturated aldehyde in the feed}}$$

Yield
$$= \frac{\text{Weight of unsaturated aldehyde converted to acid}}{\text{Weight of unsaturated aldehyde in the feed} - \text{Weight of unsaturated aldehyde in the effluent}}$$

In the case where acrolein is the unsaturated aldehyde to be oxidized, the amount of acrolein is determined by treating an aliquot of a solution with excess dinitrophenyl hydrazine or by vapor phase chromatography. Acrylic acid which is the product of the acrolein reaction was determined by titrating an aliquot of an aqueous solution with sodium hydroxide. The titrated solution was evaporated to dryness and the salt recovered therefrom was analyzed by infra-red for the acrylate. In all of the examples given below the products of the reaction were recovered by scrubbing the effluent gases from the reactor with cold water. The resulting solution is referred to in connection with the analyses mentioned above.

The examples which follow illustrate the advantages of our invention. All of these runs were made at atmospheric pressure.

*Example I*

A molybdenum oxide catalyst was prepared in the following manner:

A solution containing 235 g. of 85% molybdenum trioxide was added to 2000 g. of a 30% aqueous solution of a low alkali colloidal silica. 10 ml. of concentrated nitric acid were added to this mixture and the mixture was stirred. The solution was then evaporated until it gelled and further evaporated to dryness. It was then calcined for 12 hours at 1000° F. The final composition was ground to 40–100 mesh size.

300 g. of this catalyst were placed in a conventional oxidation reactor. A gaseous mixture having the following composition was fed to the reactor:

| Ingredient: | Volume percent |
|---|---|
| Acrolein | 13.5 |
| Air | 43.2 |
| Water | 43.2 |

At a reaction temperature of 710° F. and a contact time of 19.8 seconds the conversion was 32.3% and the yield of acrylic acid was 22.5%.

In another run employing the same catalyst, the following gaseous mixture constituted the feed:

| Ingredient: | Volume percent |
|---|---|
| Acrolein | 9 |
| Air | 45 |
| Water | 45 |

At a temperature of 700° F. and a contact time of 19 seconds the conversion was 44.1% and the yield of acrylic acid was 17.3%.

In still another run on the same catalyst employing the same feed and conditions as the previous example, except that the reaction temperature was 810° F., the total conversion was 50.5% and the yield of acrylic acid was 10.5%. This run demonstrates the deleterious effect of higher temperatures on the course of the reaction.

*Example II*

A chromium oxide catalyst was prepared according to the following procedure:

A solution of chromium oxide was prepared dissolving 72 g. of chromium trioxide in 400 ml. of water. The solution was mixed with 328 g. of silica gel. The mixture was dried on a hot plate and heated in a muffle furnace for 2 hours at 1000° F. It was then screened through a 20 mesh screen.

30 g. of this catalyst were placed in a conventional oxidation reactor, and a gaseous mixture having the following composition was fed to the reactor:

| Ingredient: | Volume percent |
|---|---|
| Acrolein | 22.8 |
| Oxygen | 8.8 |
| Water | 68.5 |

At a temperature of 480° F. and a contact time of 19 seconds the total conversion was 6.8% and the yield of acrylic acid was 46.8%.

It will be obvious to those skilled in the art that many modifications of this process may be made. However, this application for Letters Patent is intended to cover all modifications of the invention which would reasonably fall within the scope of the appended claims.

We claim:

1. A process for the manufacture of an $\alpha,\beta$-unsaturated mono-carboxylic acid which comprises the step of reacting an $\alpha,\beta$-unsaturated aldehyde selected from the group consisting of acrolein and methacrolein with oxygen in the vapor phase at a temperature in the range of about 400–850° F. and in the presence of a catalyst comprising at least one member of the group consisting of the oxides of molybdenum and chromium.

2. A process for the manufacture of an $\alpha,\beta$-unsaturated mono-carboxylic acid which comprises the step of reacting an $\alpha,\beta$-unsaturated aldehyde selected from the group consisting of acrolein and methacrolein with oxygen in the vapor phase at a temperature in the range of about 400–850° F. in the presence of water and a catalyst comprising at least one member of the group consisting of the oxides of molybdenum and chromium.

3. A process for the manufacture of an $\alpha,\beta$-unsaturated carboxylic acid which comprises the step of reacting an $\alpha,\beta$-unsaturated aldehyde with oxygen in the vapor phase in the presence of water and a catalyst comprising at least one member of the group consisting of the oxides of molybdenum and chromium, said reaction being conducted at a temperature in the range of about 400 to 850° F. and at a contact time in the range of 15 to 25 seconds.

4. A process for the manufacture of acrylic acid which comprises the step of reacting acrolein with oxygen in the vapor phase at a temperature in the range of about 400–850° F. and in the presence of a catalyst comprising at least one member of a group consisting of the oxides of molybdenum and chromium.

5. The process of claim 4 in which water is added to the reaction mixture.

6. The process of claim 4 in which the catalyst comprises molybdenum trioxide and silica gel.

7. A process for the manufacture of methacrylic acid which comprises the step of reacting methacrolein with oxygen in the vapor phase at a temperature in the range of about 400–850° F. and in the presence of a catalyst comprising at least one member of the group consisting of the oxides of molybdenum and chromium.

8. The process of claim 7 in which water is added to the reaction mixture.

9. The process of claim 7 in which the catalyst comprises molybdenum trioxide and silica gel.

10. The process of claim 4 in which the reaction temperature is about 700° F.

References Cited in the file of this patent

UNITED STATES PATENTS 2,462,938    Bludworth et al. _____ Mar. 1, 1949